United States Patent
Phillips (12) United States Patent (10) Patent No.: US 7,334,015 B1
(45) Date of Patent: Feb. 19, 2008

(54) INTEGRATION OF LEGACY MAINFRAME SYSTEMS THROUGH DATA STREAM OBJECTIFICATION INTO FINITE STATE MACHINES

(75) Inventor: James C. Phillips, San Diego, CA (US)

(73) Assignee: Vestacare, Inc., La Jolla, CA (US)

( * ) Notice: Subject to any disclaimer, the term of this patent is extended or adjusted under 35 U.S.C. 154(b) by 640 days.

(21) Appl. No.: 10/001,521

(22) Filed: Oct. 26, 2001

Related U.S. Application Data (60) Provisional application No. 60/243,806, filed on Oct. 27, 2000.

(51) Int. Cl.
*G06F 13/00* (2006.01)
(52) U.S. Cl. .................................................. 709/203
(58) Field of Classification Search ................ 709/201, 709/203, 231; 719/328, 329
See application file for complete search history.

(56) References Cited

U.S. PATENT DOCUMENTS 6,253,244 B1 * 6/2001 Moore et al. ............... 709/231

* cited by examiner

*Primary Examiner*—Robert B Harrell
(74) *Attorney, Agent, or Firm*—Duane Morris LLP (57) ABSTRACT

A system and method for integrating terminal-based legacy mainframe applications through data stream objectification into a distributed object system. The mainframe application's terminal data stream is reinterpreted as a set of well-defined state objects representing any identifiable portion or accumulation of either terminal commands or data within the data stream. The state objects are combined with a set of state transition rules to create a finite state machine, which accurately describes the behavior of the application, the application of all existing busing logic, and access to all the data elements. Any required set of data elements can then be defined and either accessed or updated through a variety of methodologies without redefining, re-implementing, or migrating any existing data or business rules.

40 Claims, 11 Drawing Sheets

INTEGRATION OF LEGACY MAINFRAME SYSTEMS THROUGH DATA STREAM OBJECTIFICATION INTO FINITE STATE MACHINES

This application claims the benefit of U.S. Provisional Patent Application No. 60/243,806, filed Oct. 27, 2000.

FIELD OF THE INVENTION

The present invention relates generally to data processing systems and, more particularly, to the integration of legacy mainframe applications with distributed object systems.

DISCUSSION OF RELATED ART

There are a variety of tools, technologies, and methodologies currently available for performing systems integration, particularly connecting legacy mainframe/terminal-based application with more modern distributed Internet/intranet applications. The existing methodologies, can be broken down into three primary categories: API access, database connectivity, and screen-scraping. All three methodologies can be implemented in any number of ways, from simple driver interface protocols such as ODBC or JDBC, to true application servers. But regardless of the implementation details, the actual integration process will fall into one of those three categories.

An Application Programming Interface ("API") is a set of methods which act on one program or application which can be called or referenced by another program or application. API access is the most stable of the three traditional interface methodologies. But setting up API access for legacy mainframe applications, which rarely have an open and accessible API, is the most time consuming and costly as it requires substantial re-writing of much or all of the legacy application, and the creation of specialized applications to interface to the API which must be recreated in every instance. The interface is also limited to only the set of data and business logic which is explicitly made available by the API. If additional access is required in the future, then the interface must be rebuilt to include the additions.

Database driver interfaces are a very stable method of integration, and can—in some cases—be very quick to implement. An interface which uses a database driver interface also gives the external system total access to all the data by default. If the database schema is available, then utilizing the driver interface can be very quick and easy. But if the schema is not available, as is often the case with legacy applications, then a great deal of time and effort must be invested in order to reverse-engineer the database scheme before any data can be accessed. The use of a database driver interface also eliminates the possibility of utilizing any of the existing business logic, and in fact all the business logic required to read, write, and understand the data elements must be completely recreated.

Traditional screen-scraping is a process in which a middleware package accesses a legacy terminal-based application as a user with a terminal emulator would. A script is written which accesses the various screens within a terminal-based application to submit data, and read data out based on its position on the screen. Screen-scraping gives the middleware access to all the data and all the business logic contained in a legacy application very quickly and easily. Traditional screen-scraping is, however, notoriously unreliable and difficult to maintain.

Many of today's application programs are built using an object-oriented methodology, commonly written in object-based programming languages such as C++, Java, and others. The explosion of the Internet in recent years, has increased the popularity of various distributed-object methodologies such as CORBA, RMI, and others which allow an application to access data and/or services which reside on remote computers accessible through the Internet or an intranet. Organizations are struggling to migrate their systems and applications to a distributed model because of the inherent flexibility the model provides, but they are being held back by the presence of one or more legacy mainframe systems which contain the majority of their data. In fact, the vast majority of data is still contained in these legacy mainframe applications.

There are a variety of tricks and technologies which organizations can utilize to access an integrate the data locked inside legacy mainframe applications. However, the common legacy integration methods either require an unreasonably large capital expenditure to implement, cause an unacceptable level of disruption to ongoing operations, or are inherently unstable and unreliable. It is therefore desirable to have an alternative legacy integration methodology which can be implemented rapidly, is both stable and scalable, and represents a much lower-cost solution.

SUMMARY OF THE INVENTION

The invention is a method and system for conducting the exchange of data with a terminal-based application program. A plurality of available states within a terminal data stream of the terminal-based application program are mapped to respective discrete state definitions within a finite state machine. Any element, terminal command, data item, or sequence of terminal commands and data items within the terminal data stream is interpreted as a discrete state having a respective one of the state definitions. An object model containing a set of interfaces is used. The interfaces are utilized as the basis for the state definitions. A plurality of state transition rules are defined, which are utilized to manipulate the state definitions within the finite state machine.

OVERVIEW OF THE EXEMPLARY EMBODIMENTS

Figure 1:
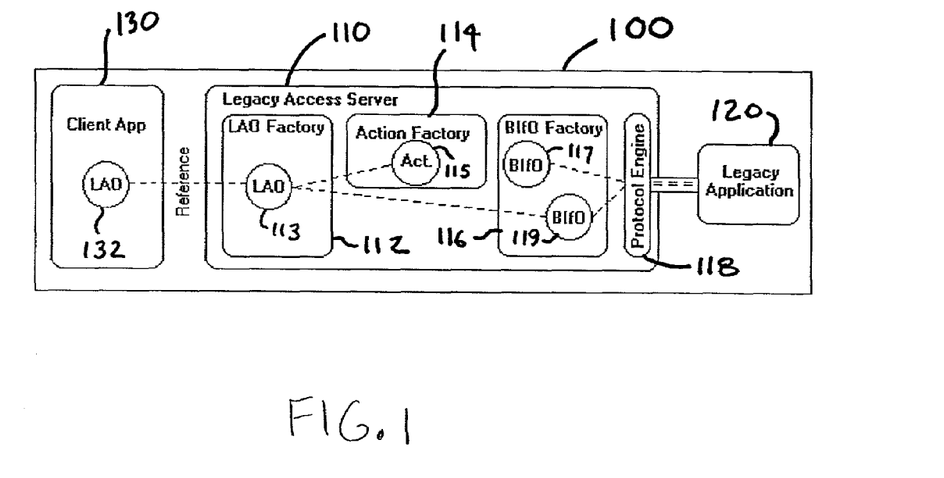
FIG. 1 depicts a block diagram of the components of a system that includes an exemplary Legacy Access Server.

FIG. 1 shows a system 100 including an exemplary legacy access server 110. The legacy access server ("LAS") 110 is located on a middle-tier server which has access to a terminal-based legacy mainframe application 120 via any terminal control protocol 118 (e.g., Telnet, TN3270, and the like), and makes its pre-defined data set objects ("Legacy Access Objects" or "LAOs" 113) available to authorized clients 130 via any object distribution mechanism. A client 132 is then able to request a reference 132 to any LAO 113 which the server 110 makes available, and utilize the methods on the LAO 113 to either access data within the legacy system 120 or to store data into the legacy system. The LAO 113 contains rules, which are utilized by the LAS 110 as the state transition rules that drive state transitions within the terminal data stream, and hence drive the application and business logic embodied in the legacy application 120 to retrieve and enter data. Because the selection and ordering of data items within a Legacy Access Object 113 is separated from the details of the legacy application 120, any number of LAOs 113 can be defined and constructed to provide access to the underlying functionality of legacy application 120 in a variety of ways. These ways may include either collating data from multiple locations within the legacy application 120 into a single discrete view, or narrowing the accessibility of particular data sets and limiting access by client 130. Because the LAS 110 accesses the existing terminal data stream from protocol engine 118, no migration of existing data, no re-implementation of business logic, and no alteration of existing resource or use patterns is required.

Figure 7:
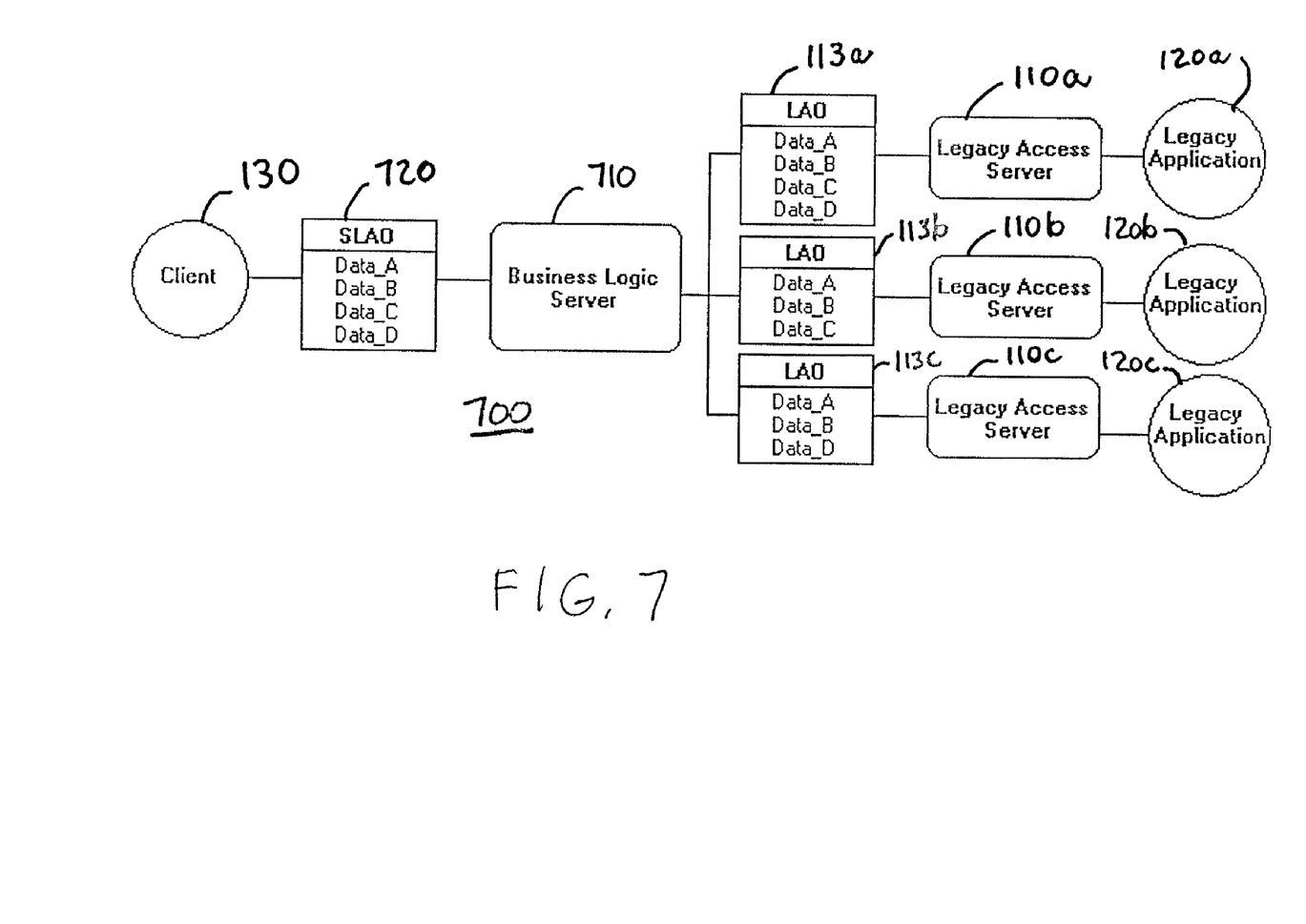
FIG. 7 depicts the schematic interaction surrounding a Business Logic Server.

FIG. 7 shows a second exemplary configuration 700 having a plurality of LASs 110a-110c. Multiple Legacy Access Servers 110a-110c, each wrapping a distinct legacy application 120a-120c, can be unified and resolved through a Business Logic Server ("BLS") 710, which resides on another middle-tier server, which has client access to the various Legacy Access Servers via any distributed object mechanism. The BLS 710 appears to its components LASs 110a-110c as any client 130 would, and true clients are able to access a BLS 710 in the same way they would access an LAS 110. The Business Logic Server 710 (BLS) presents a set of Super-Legacy Access Objects 720 (SLAOs) to the clients 130 through any available distributed object mechanism, where the SLAOs 720 represent any definable data set across the available LAOs 113a-113c presented by the underlying LASs 110a-110c. The SLAO 720 comprises a set of data resolutions rules, which describe the appropriate actions to be taken in order to resolve data from the various LAOs 113a-113c being accessed, resolve conflicts between similar data items from separate legacy applications 120a-120c, and any other unification, resolution, or translation that may be necessary.

Figure 10:
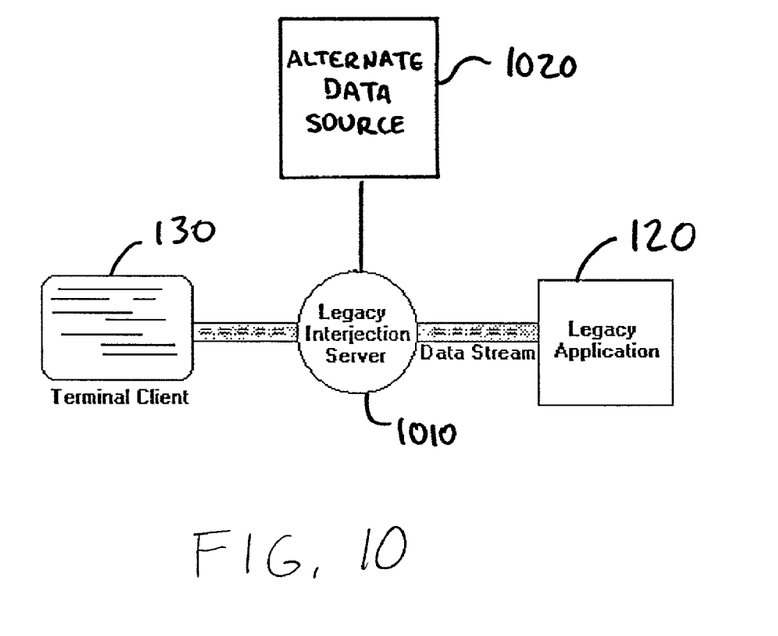
FIG. 10 depicts the monitor state of a Legacy Interjection Server, in its primary active state.

FIG. 10 shows another exemplary configuration 1000. In system 1000, a Legacy Access Server for a particular legacy application 120 can serve as the foundation for a Legacy Interjection Server ("LIS") 1010. An LIS 1010 resides on a middle-tier server between a legacy application 120 accessible via any standard terminal control protocol, and either a terminal or terminal-emulator client 130. The LIS 1010 monitors the data steam between the terminal client 130 and the legacy application 120 until one or more interjection criteria are met. At that point, the LIS 1010 can access an Alternate Data Source (ADS) and alter the user's view of the application by creating new data elements within existing screens, or creating entirely new screen sets for the user to navigate without altering the underlying legacy application. When the LIS 1010 has completed the manipulation and alteration of the user's view of the application 120, direct client terminal control is returned to the legacy application.

DETAILED DESCRIPTION OF THE INVENTION

Referring again to FIG. 1, an exemplary system 100 according to the present invention provides a connectivity engine which manages the details of communicating via a terminal command protocol (e.g. Talnet, TN3270), a set of interfaces and base classes with which to define the various components of the legacy access system, and an Application Programming Interface ("API") which provides client 120 access to the system. The exemplary embodiment 100 also comprises a graphical user application ("GUI application") to automate the generation of implementation-specific code for a Legacy Access Server 110, and a second GUI application to automate the generation of implementation-specific code for a Business Logic Server 710 (FIG. 7).

Although the exemplary embodiment described below defines a specific object model, class structure, and API, one skilled in the art will appreciate that an alternative embodiment may specify a different object model, class structure, and API that utilizes a different model for the realization of a finite state machine, is implemented in a different programming language, or provides for a different mode of client access.

In this exemplary embodiment, the central point of the legacy access system 100 is the Legacy Access Server 110 ("LAS"). An exemplary class interface for this exemplary embodiment of the LAS 110 is as follows:

public interface LAS {public void movieEnabled (boolean movieOn);
   public void traceEnabled (boolean traceOn);
   public LAO getLAO (String name) throws Exception;
   public void start () throws ConnectionException;
   public void stop();
   public void setLog (String file) throws IOException;
   public void enableLog (boolean on);}

The start () method connects the terminal data stream (indicated by the dashed line of FIG. 1) to the legacy application 120, and the stop () method disconnects the data stream. The movieEnabled (boolean) method turns a "movie" or visual representation of the terminal state "on" or "off," depending on the state of the boolean flag. The traceEnabled (boolean) method turns tracing on or off depending on the state of the boolean flag. Logging of the session is accomplished using the setLog (String) and enableLog (boolean) methods. A primary function of a LAS 110 is to provide the client with LAO references 132, which is done using the getLAO (String) method, which will return the requests LAO 113.

FIG. 1 shows the internal structure of the LAS 110. Three object factories are maintained, an LAO Factory 112, an Action Factory 114, and a Buffer Interface Object (BifO) Factory 116, as well as a terminal protocol engine 118, which is responsible for dealing with the specifics of whatever terminal control protocol is being utilized to communicate with the legacy application 120.

Figure 2:
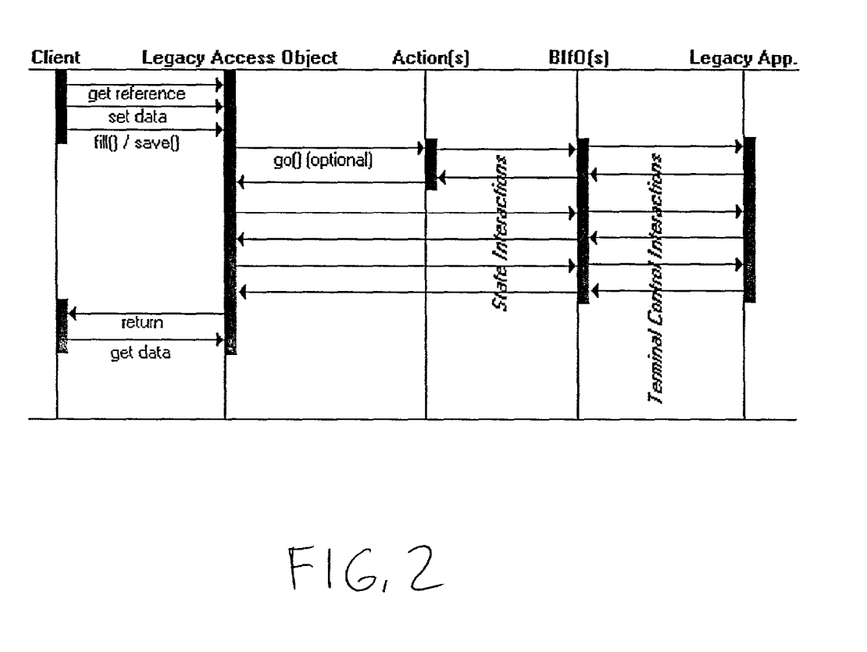
FIG. 2 depicts a control flow diagram for the Legacy Access Server of FIG. 1.

FIG. 2 depicts the flow control diagram from the client application 130 making requests on an LAO 113 through the legacy access server 110, and from there to the legacy application 120. Data are first passed from the client 130 to LAO 113 using the various getter and setter methods on a specific LAO instance. The LAO 113, which is the embodiment of the state transition rules required to achieve a certain result from the legacy application 120, then interacts with the Action 115 and BIfO instances 117, 119 to drive the state machine to the desired target state while reading and storing the relevant data elements which may appear in any of the states passed through towards the desired target state. The terminal emulation engine 118 handles the actual transmission and receipt of data to and from the legacy application 120.

Figure 3:
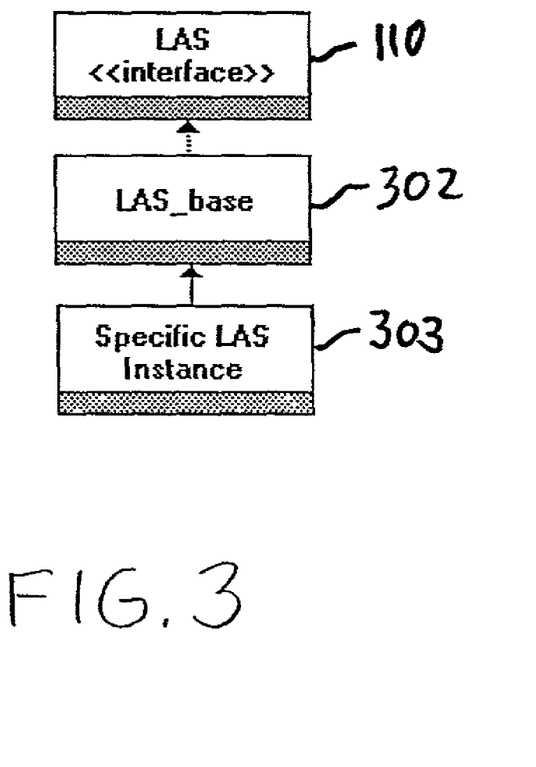
FIG. 3 depicts the class diagram for a Legacy Access Server framework.

FIG. 3 depicts the Unified Modeling Language (UML) diagram for the LAS framework, which comprises the interface as described above and an abstract class to provide a default implementation for appropriate methods. As and extension of com.dialogos.legacy.las.LAS_base 302, as seen in FIG. 3.

Figure 4:
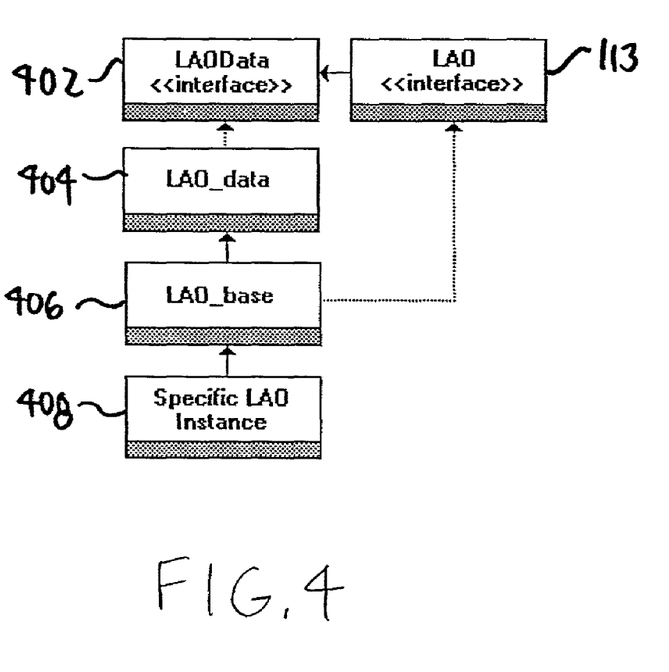
FIG. 4 depicts the class diagram for the Legacy Access Objects.

FIG. 4 shows an exemplary LAO 113. The Legacy Access Objects ("LAOs") 113 provide the wrapping from raw legacy application data to a usable and convenient format for a distributed client. If the legacy data are viewed as a very abstract imposed-relational database, then an LAO 113 forms a view on, or recordset of, those data. LAO references 132 are retrieved by the LAS 110 from an LAO Factory 112 and passed to the client 130. In order to insure the efficient transmission of data across a distributed object framework, each LAO 113 includes two components. The first component is the LAOData object 402 (FIG. 4), whose interface for this exemplary embodiment follows:

public interface LAOData {public Byte getByte(int item) throws InvalidItemException, NumberFormateException;
    public void setByte (int item, Byte value) throws InvalidItemException;
    public Character getCharacter (int item) throws InvalidItemException, DataLossException;
    public void setCharacter (int item, Character value)

throws InvalidItemException;
    public Double getDouble(int item) throws

InvalidItemException,

NumberFormatException;
    public void setDouble (int item, Double value) throws InvalidItemException;
    public Float getFloat(int item) throws InvalidITemException, NumberFormatException;
    public void setFloat(int item, Float value) throws InvalidItemException;
    public Integer getInteger(int item) throws InvalidItemException, NumberFormatExeption;
    public void setInterger(int item, Integer value)

throws InvalidItemException;
    public Long getLong(int item) throws

InvalidItemException,

NumberFormatException;
    public void setLong(int item, Long value) throws

InvalidItemException;
    public Short getShort(int item) throws

InvalidItemException,

NumberFormatException;
    public void setShort(int item, Short value) throws

InvalidItemException;
    public String getString(int item) throws

InvalidItemException;
    public void setString(int item, String value) throws

InvalidItemException;
    public Byte[] getByteArray(int item) throws

InvalidItemException,

NumberFormatException;
    public void setObject(int item, Object value) throws

InvalidItemException;
    public Object getObject(int item) throws

InvalidItemException;
    public void setByteArray(int item, Byte [] values)

throws InvalidItemException;
    public Character[] getCharacterArray(int item)

throws InvalidItemException,

DataLossException;
    public void setCharacterArray(int item, Character[] values)

throws InvalidItemException;
    public Double[] getDoubleArray(int item) throws InvalidItemException, NumberFormatExeption;
    public void setDoubleArray(int item, Double [] values) throws InvalidItemException;
    public Float[] getFloatArray(int item) throws InvalidItemException, NumberFormatException;
    public void setFloatArray(int item, Float[] values)

throws InvalidItemException;
    public Integer[] getIntegerArray(int item) throws InvalidItemException, NumberFormatException;
    public void setIntegerArray(int item, Integer[] values) throws InvalidItemException;
    public Long[] getLongArray(int item) throws InvalidItemException, NumberFormatException;
    public void setLongArray(int item, Long[] values)

throws InvalidItemException;
    public Short[] getShortArray(int item) throws

InvalidItemException,

NumberForamtException;
    public void setShortArray(int item, Short[] values)

throws InvalidItemException;
    public String[] getStringArray(int item) throws InvalidItemException;
   public void setStringArray(int item, String[] values) throws InvalidItemException;
   public void setObjectArray(int item, Object[] value) throws InvalidItemException;
   public Object[] getObjectArray(int item) throws InvalidItemException;}

All of the methods defined by this LAOData interface 402 are used to retrieve and set the various data members 404 contained by the LAO 113 as each specified data type. Any field can be defined and accesses as any number of different data types, so long as a standard conversion is available. Data 404 are loaded and saved by the LAO 113 by driving the state transitions through the Action 114 and BIfO 116 interfaces, and accessing the data contained within the various states through the BiFO interface.

The second component of an LAO 113 is the actual LAO 113, whose interface for this exemplary embodiment is as follows:
   public interface LAO extends LAOData
   {public boolean hasMore ();
   public void fill() throws InvalidHostContextException;   KeyNoteSetException, IOException, Exception;
   public void save() throws InvalidHostContextException, IOException, Exception;
   public LAOData getAllData();
   public void setAllData (LAOData data) throws InvalidDataException;}

The fill () method directs the LAO 113 to fill its data members 404 with data from the host application 120. The save () method directs the LAO 113 to take the data currently loaded and save it back into the host application 120. The hasMore () method, returns "true" if the LAO 113 has filled itself, but there remains the possibility of additional data within the host which would require a subsequent fill () call to retrieve. The getAllData () and setAllData (LAOData) methods are used to get and set, respectively, all of the data members 404 at once. This is why the LAO 113 is defined by the two components; the data object LAOData 402 can be "broken off" and returned across the distribution wire in a single transmission.

FIG. 4 depicts the UML for LAOs 113 for specific implementations, which are defined by the developer or user of the generation tool. Any number of LAOs 113a-113c can be defined, representing any set of data contained within the legacy application 120, depending upon the differing requirements of different clients 130a-113c.

The LAOFactory 112 for this exemplary embodiment comprises a single factory class which dynamically loads the LAO instances 408 as they are needed. As such, there is no need for specific, system-dependent re-implementation of the LAOFactory 112.

Figure 5:
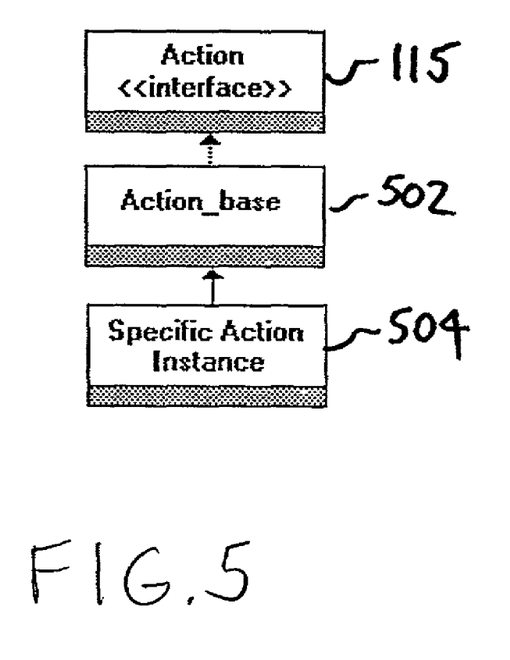
FIG. 5 depicts the class diagram for the Action Objects.

FIG. 5 depicts the UML diagram for Action implementations. This exemplary embodiment includes the Action class 115, which are utility objects, which one skilled in the art will recognize as being useful but not required to practice this invention. Actions 115 represent definable, reusable patterns in the state transition rules which do not require the intervention or access of specific dynamic data elements. They are static paths through the state machine which can be accessed by LAOs 113a-113c in order to simplify the development of a set of LAOs by reusing the path definition in the Action 115. The interface for this exemplary embodiment is as follows:
   public interface Action {
   public void run() throws Exception;
   public String name();}

The name () method is a convenience method for retrieving the name of Action 115, which will be the class name of a specific instance 504 of Action. The run () method 'runs' the Action—attempting to navigate from the current state of the desired destination state.

The ActionFactory 114 for this exemplary embodiment comprises a single factory class which dynamically generates Actions 115 as they are requested by LAOs 113a-113c. As such, there is no need for specific, system-dependent re-implementations of the ActionFactory.

Figure 6:
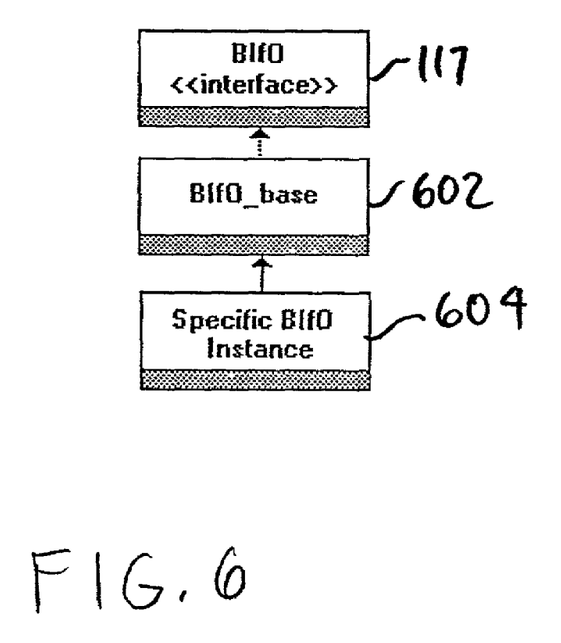
FIG. 6 depicts the class diagram for the Buffer Interface Objects.

FIG. 6 depicts the UML diagram for specific instances 604 of Buffer Interface Objects 117, 119. The Buffer Interface Objects ("BIfOs") 117 are the representations of the actual states within the state machine. A single BifO 604, or a single state, can map to any portion of the terminal data stream—from a single terminal command or data element, all the way to the total sequence of terminal commands and data elements required to build an entire user screen. The BIfOs 604 are accessed by both LAOs 113a-113c and Actions 115 to identify the current context (state) of the legacy application 120, retrieve data from the legacy application, and transmit data to the legacy application 120. BIfOs 604 implicitly define a set of the possible data elements, to which the BIfO 117 has access, and upon which the various methods in the BIfO interface 117 can act, which for this exemplary embodiment is as follows:
   public interface BIfO{
   public void setSession (Terminal s);
   public void setKey (int key);
   public int getKey();
   public String getName();
   public boolean isItYou();
   public int length(int fieldKey);
   public String decompose(int fieldKey) throws Exception;
   public String decompose(int fieldKey, int index) throws Exception;
   public Object decompose(int fieldKey) throws Exception;
   public Object decompose(int fieldKey, int index) throws Exception;
   public void compose(int filedKey, String data) throws Exception;
   public void compose(int fieldKey, String dat, int index) throws Exception;
   public void compose(String dat) throws Exception;
   public void compose(int fieldKey, Object dat) throws Exception;
   public void compose(int fieldKey, Object data, int index) throws Exception;
   public void compose(Object dat) throws Exception;}

The setSession (Telnet) method is used to provide the BIfO 117 with a reference to the active terminal controller, if it is not defined when the BIfO is constructed. Similarly, setKey(int) provides the BIfO with its enumeration key, while the getKey() method returns the BIfOs enumeration key, and getName() returns the BIfOs class name. The remaining methods are utilized by the state transition rules embodied in the Actions 115 and LAOs 113 to identify and manipulate the state machine:

isItYou() returns to boolean value corresponding to whether or not the BIfO recognizes itself as the current state.

length(int) returns the number of data items contained by the field specified.

decompose(int) returns the data contained by the specified field.

decompose(int, int) returns the data at the provided index in the specified field.

compose(int, String) and compose(int, Object) insert the provided data into the specified field.

compose(int, String, int) and compose(int, Object, int) insert the provided data into the specified field at the specified index position.

compose(String) and compose(Object) inserts the provided data directly into the terminal control stream.

Ideally, the first step in building an LAS 110 is to generate the complete set of requisite BIfOs 117, 119, which can then be used as the building blocks for future Actions 115 and LAOs 113.

Unlike LAOs 113 and Actions 115, BIfOs 117 are not requested by a software component, but are dictated by the legacy application 120. Consequently, the BIfOFactory 116 is fundamentally different from both the LAOFactory 112 and the ActionFactory 114. A new implementation-specific BIfOFactory is generated for each instance 303 of a Legacy Access Server 110, which must monitor the state of the terminal control stream and only return a reference to whichever BIfO 604 represents the current state of the application 120.

FIG. 7 depicts a system 700 having interaction between a distributed client 130, a single Business Logic Server 710 ("BLS"), and three LAS instances 110a-110c, each wrapping a respective legacy application 120a-120c. In order to unify and resolve data across multiple Legacy Access Servers 110a-110c, this exemplary embodiment utilizes a BLS 710, whose purpose is to manage client access to the data objects. The class interface for this exemplary embodiment of the BLS is as follows:

public interface BLS{public void start();
public void stop();
public LAS getLAS (String);
public SLAO getSLAO (String);}

The start() method connects the Business Logic Server 710 to the Legacy Access Servers 110 and starts them, and the stop() method disconnects them. The primary function of the BLS 710 is to provide the client 130 with Super Legacy Access Object 720 ("SLAO") references (Data_A through Data_D), which is done using the getSLAO (String) method, which returns the requests SLAO.

Figure 8:
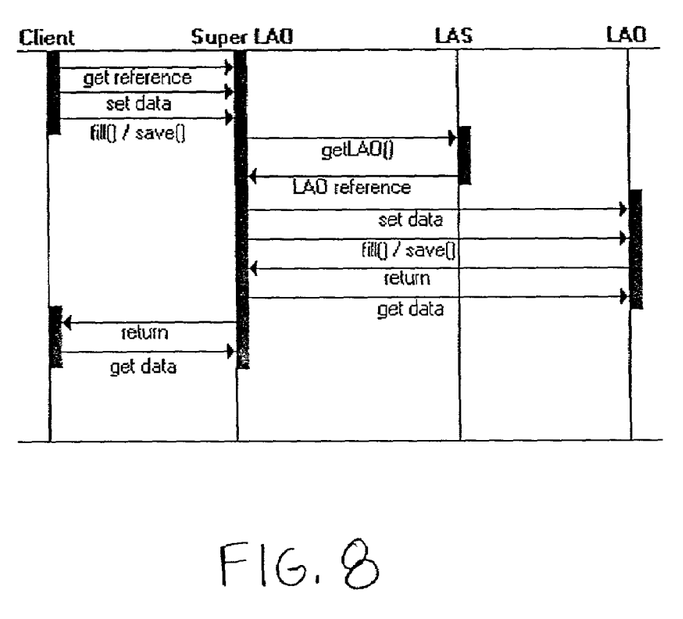
FIG. 8 depicts a control flow diagram for a Business Logic Server.

FIG. 8 depicts the control flow diagram for a Business Logic Server 710. A client 130 first requests a reference to some SLAO 720 which has been defined for the BLS instance 710. The client 130 then activates the SLAO 720 to either retrieve or submit its data set from/to the underlying LASs 110a-110c. The SLAO 720 then uses its internal resolution rule to first access the data contained in the appropriate LAOs 113a-113c and then to unify and resolve those data. Missing or incorrect data in one or more of the systems 120a-120c can be updated in order to properly synchronize the data across all the systems 120a-120c, spelling errors and data entry errors can be corrected using any one of a number of different selection and resolution algorithms, any other implementation-dependent data unification and resolution is performed.

Figure 9:
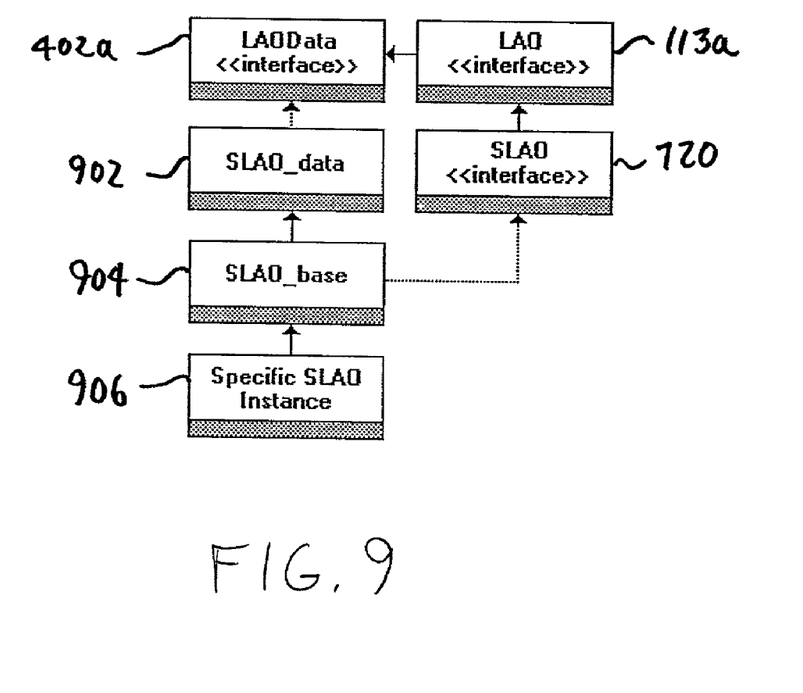
FIG. 9 depicts the class diagram for Super Legacy Access Objects.

FIG. 9 depicts the UML diagram for the Super Legacy Access Objects 720 ("SLAO"). The SLAO 720 is constructed in a manner identical to the construction of the LAOs 113a-113c, and in fact the actual SLAO interface is simply an empty extension of the LAO interface 113. Likewise, the SLAOData interface 902 is an empty extension of the LAOData interface 402. The difference between an LAO 113 and an SLAO 720 is, of course, functional. An LAO 113, is implemented with the state transition rules required to navigate the state machine, whereas an SLAO 720 is implemented with the data unification and resolution rules required to resolve multiple LAO data items 404 into a single view.

FIG. 10 shows an exemplary system 1000 for the operation of a Legacy Interjection Server 1010 ("LIS"). LIS 1010 is best described by the various operational states the LIS moves through to provide services to a client 130. FIG. 10 depicts the LIS 1010 in its initial monitor state. The LIS 1010 exists between a terminal or terminal emulator client 130 and the legacy application 120, and monitors the terminal control stream being passed between the client and the server. The LIS 1010 watches for the occurrence of Interjection Criteria in the control stream, which is a state within the stream that signals to the LIS that it should move into its next operational state.

FIG. 10 depicts the primary active state of the LIS 1010. The LIS 1010 pauses the terminal control stream from the legacy application 120, and interacts with an Alternate Data Source 1020 (ADS)—which can be anything from a modern relational database server to another legacy application—to access data and present new data items, new terminal screens, or a new sequence of terminal screens to the user. This allows modifications to be made to the user's interface and experience, and to add data and workflow without disrupting the existing user processes and without the user even knowing that a new system 1000 is in place.

Figure 11:
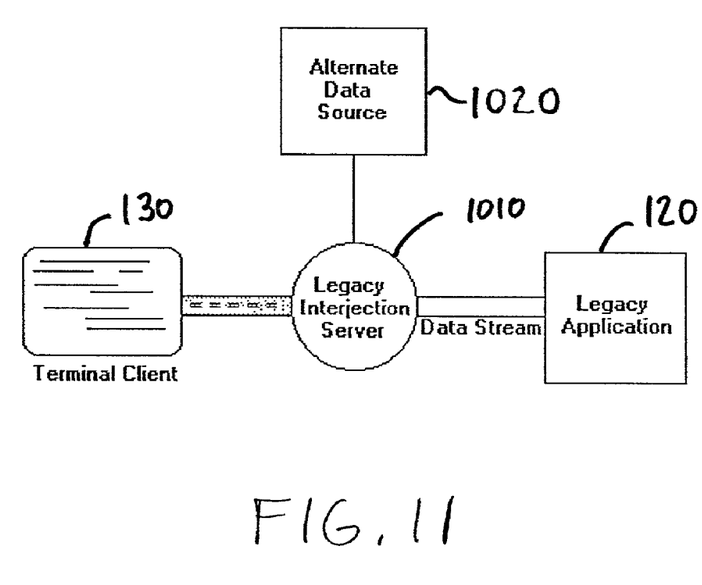
FIG. 11 depicts the secondary device active state of a Legacy Interjection Server.

FIG. 11 depicts the secondary active state of the LIS 1010. Commonly, the alternate data elements or user screens may require additional data to be provided to the legacy application 120 or for the legacy application to be in a different state before the connectivity directly to the user is restored. Thus, the secondary active state involves the use of a Legacy Access Server 110 to make these changes in the legacy application 120.

Once the LIS 1010 has updated the state of the legacy application 120 appropriately to match the state of client 130, the LIS returns to its initial monitor state (see FIG. 10) by unblocking the terminal control stream from the legacy application 120 directly to client 130.

From the foregoing description, it will be appreciated that the present invention provides an improved alternative system and method for interfacing or wrapping legacy terminal-based applications. The central component of the system is a Legacy Access Server 110, which provides access by client 130 to definable data sets within the legacy application 120. A series of Legacy Access Servers 110a-110c can be integrated, unified, and resolved, through a secondary component of the system described as a Business Logic Server 710 which provides client access to definable data sets across the Legacy Access Servers 110a-110c. a tertiary component is described as a Legacy Interjection Server 1010, which leverages the primary components of the system to alter the legacy application interface provided to terminal or terminal emulator clients 130 without requiring reprogramming of the actual legacy application.

The foregoing system components may conveniently be implemented in one or more program modules that are based upon the UML diagrams of FIGS. 3, 4, 5, 6, and 9, and the features illustrated in the remaining figures. No particular programming language has been described for implementing any component of the system, as it is considered that the operations, steps, and procedures described above and illustrated in the accompanying drawings are sufficiently disclosed to permit one of ordinary skill in the art to implement the present invention using any object-oriented programming language. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, DVDs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims and their range of equivalents, rather than the foregoing examples.

What is claimed is:

1. A method for conducting an exchange of data with a terminal-based application program comprising:
    (a) mapping a plurality of available states within a terminal data stream of the terminal-based application program to respective discrete state definitions within a finite state machine, including:
        (1) interpreting any element, terminal command, data item, or sequence of terminal commands and data items within the terminal data stream as a discrete state having a respective one of the state definitions, and
        (2) using an object model containing a set of interfaces, said interfaces being utilized as a basis for the state definitions;
    (b) prompting a user for rules criteria and expected outcomes of the respective state definitions;
    (c) aggregating the plurality of available states within the terminal data stream to eliminate redundant states, including:
        (1) accessing data in the plurality of available states;
        (2) unifying and resolving the data in the plurality of available states to eliminate the redundant states; and,
    (d) defining a plurality of state transition rules which are utilized to manipulate the state definitions within the finite state machine.

2. The method of claim 1, further comprising altering an interface presented to a user of the terminal-based application program through addition of one of a group consisting of new screens and new data fields within existing screens, wherein the new screens and new data fields are populated with data retrieved from an alternate data source.

3. The method of claim 2, further comprising monitoring the terminal data stream.

4. The method of claim 3, further comprising:
    recognizing pre-defined states within the terminal data stream, which define one or more states during a user's interaction with the terminal-based application program; and
    presenting the new data screens or fields to the user.

5. The method of claim 4, wherein the unifying and resolving of the data in the plurality of available states to eliminate the redundant states further comprises:
    synchronizing the data in the plurality of available states; and
    correcting spelling errors or data entry errors in the data in the plurality of available states.

6. The method of claim 2, wherein the object model describes interaction between the alternate data source and a program that performs steps (a) and (d).

7. The method of claim 2, wherein the object model describes:
    the addition of new user screens or the addition of new data fields to existing application screens, and
    interaction between the user and the new screens or fields.

8. The method of claim 1 further comprising unifying and resolving multiple terminal-based applications through unification and resolution of a plurality of instances of a program that performs steps (a) and (b).

9. The method of claim 8, further comprising using an expert system which accesses and resolves data items from the plurality of instances of the program that performs steps (a) and (d) and translates them into cohesive super sets of data.

10. The method of claim 9, further comprising using the object model for creating data resolution and translation rules.

11. The method of claim 9 further comprising using the object model for definition of actions to proactively resolve data errors or discrepancies across an underlying plurality of instances of the program that performs steps (a) and (d).

12. The method of claim 8, further comprising creating a plurality of data sets, each data set being formed through a unification of multiple data sets from the plurality of instances of the program that performs steps (a) and (d).

13. The method of claim 8, wherein each object model is a distributed object transaction model which allows for access to data from the terminal-based application program by any local or remote client service, system, or application.

14. The method of claim 1, wherein the object model contains the set of interfaces and a set of classes.

15. The method of claim 1, wherein manipulation of the state transition rules allows for two-way communication between a client and the terminal-based application program.

16. The method of claim 1, further comprising creating one or more data sets, each comprising a definable set of data elements from within the terminal-based application program.

17. The method of claim 1, wherein the object model is a distributed object transaction model, which allows for access to data from the terminal-based application program by any local or remote client service, system, or application.

18. The method of claim 1 further comprising using software tools to automate creation and maintenance of an integration system based on knowledge of a domain of the terminal-based application program.

19. A apparatus for conducting an exchange of data with a terminal-based application program comprising:
   a programmed processor with a finite state machine, in which a plurality of available states within a terminal data stream of the terminal-based application program are mapped to respective discrete state definitions, including:
      means for interpreting any element, terminal command, data item, or sequence of terminal commands and data items within the terminal data stream as a discrete state having a respective one of the state definitions;
      means for using an object model containing a set of interfaces, said interfaces being utilized as a basis for the state definitions;
      means for prompting a user for rules criteria and expected outcomes of the respective means for aggregating the plurality of available states within the terminal data stream to eliminate redundant states; and
      means for defining a plurality of state transition rules which are utilized to manipulate the state definitions within the finite state machine.

20. The apparatus of claim 19 wherein multiple terminal-based applications are unified and resolved through unification and resolution of a plurality of instances of the finite state machine.

21. The apparatus of claim 20, further comprising an expert system which accesses and resolves data items from the plurality of instances of the finite state machine and translates them into cohesive super sets of data.

22. The apparatus of claim 21, wherein the object model is used for creating data resolution and translation rules.

23. The apparatus of claim 21 wherein the object model is used for definition of actions to proactively resolve data errors or discrepancies across and underlying plurality of the finite state machine.

24. The apparatus of claim 20, further comprising a plurality of data sets, each data set being formed through a unification of multiple data sets from the plurality of instances of the finite state machine.

25. The apparatus of claim 20, wherein each object model is a distributed object transaction model which allows for access to data from the terminal based application program by any local or remote client service, system, or application.

26. The apparatus of claim 19, further comprising an interface presented to a user of the terminal-based application program, the interface formed through addition of one of a group consisting of new screens and new data fields within existing screens, wherein the new screens and new data fields are populated with data retrieved form an alternate data source.

27. The apparatus of claim 26, further comprising means for monitoring the terminal data stream.

28. The apparatus of claim 27, wherein:
   pre-defined states are recognized within the terminal data stream, which define one or more states during a user's interaction with the terminal-based application program; and
   the new data screens or fields are presented to the user.

29. The apparatus of claim 26, wherein the object model describes interaction between the alternate data source and the finite state machine.

30. The apparatus of claim 26, wherein the object model describes;
   the addition of new user screens or the addition of new data fields to existing application screens, and
   interaction between the user and the new screens or fields.

31. The apparatus of claim 19, further comprising a tool which automates capture of a terminal data stream and the creation of state definitions for a particular terminal-based application.

32. The apparatus of claim 31, wherein the tool allows the user to define the data sets which will be made available.

33. The apparatus of claim 32, wherein the tool allows the user to define state transition rules to access and manipulate the data sets, to read and write data elements, using a point-and-click flowchart-style interface.

34. The apparatus of claim 31, further comprising software tools which automate creation and maintenance of a unification and resolution system based on a knowledge of underlying integration systems being unified.

35. The apparatus of claim 31, wherein the tools allows the user to define the data super-sets which will be made available by the system.

36. The apparatus of claim 31, wherein the tool allows the user to create and define data unification and resolution rules.

37. The apparatus of claim 31, wherein the tool allows the user to define rules to manage data errors, and discrepancies in the terminal data stream.

38. The apparatus of claim 19, wherein the object model contains the set of interfaces and a set of classes.

39. The apparatus of claim 19 further comprising software tools that automate creation and maintenance of an integration system based on knowledge of a domain of the terminal-based application program.

40. A method of defining and configuring the exchange of data with a terminal-based application, comprising:
   (a) accessing a targeted legacy application on at least one legacy application server;
   (b) evaluating operated information and defined rules on the targeted legacy application;
   (c) modeling the targeted legacy application with a legacy application profile, screen, and data stream definitions;
   (d) providing automated and dynamically directed execution and runtime processing environment operating concurrently and coordinated across the at least one legacy application server;
   (e) providing processed legacy information objects using the objectification definitions in customizable formats and structures for access by multiple requesting applications.

* * * * *